(12) United States Patent
Gaza et al.

(10) Patent No.: US 10,169,412 B2
(45) Date of Patent: * Jan. 1, 2019

(54) SELECTIVITY ESTIMATION FOR QUERY EXECUTION PLANNING IN A DATABASE

(71) Applicant: International Business Machines Corporation, Armonk, NY (US)

(72) Inventors: Lukasz Gaza, Jankowice (PL); Artur M. Gruszecki, Cracow (PL); Tomasz Kazalski, Cracow (PL); Konrad K. Skibski, Zielonki (PL); Tomasz Stradomski, Bedzin (PL)

(73) Assignee: International Business Machines Corporation, Armonk, NY (US)

( * ) Notice: Subject to any disclaimer, the term of this patent is extended or adjusted under 35 U.S.C. 154(b) by 722 days.

This patent is subject to a terminal disclaimer.

(21) Appl. No.: 14/694,033

(22) Filed: Apr. 23, 2015

(65) Prior Publication Data

US 2016/0110419 A1 Apr. 21, 2016

Related U.S. Application Data

(63) Continuation of application No. 14/517,964, filed on Oct. 20, 2014.

(51) Int. Cl.
*G06F 17/30* (2006.01)

(52) U.S. Cl.
CPC .. *G06F 17/30469* (2013.01); *G06F 17/30345* (2013.01); *G06F 17/30528* (2013.01)

(58) Field of Classification Search
CPC ............................................... G06F 17/30469
USPC ........................................................ 707/768
See application file for complete search history.

(56) References Cited

U.S. PATENT DOCUMENTS 6,311,181 B1 10/2001 Lee et al.
6,460,045 B1 * 10/2002 Aboulnaga ....... G06F 17/30469

(Continued)

OTHER PUBLICATIONS

Poosala et al., "Selectivity Estimation Without the Attribute Value Independence Assumption," VLDB '97 Proceedings of the 23rd International Conference on Very Large Data, 1997, pp. 486-495 Morgan Kaufmann Publishers Inc. San Francisco, CA, USA © 1997.

(Continued)

*Primary Examiner* — Kimberly L Wilson
(74) *Attorney, Agent, or Firm* — Peter J. Edwards (57) ABSTRACT

A computer-implemented method of estimating selectivity of a query may include generating, for data stored in a database in a memory, a one-dimensional value distribution for each of a plurality of attributes of the data. A multidimensional histogram may be generated, wherein the multidimensional histogram includes the one-dimensional value distributions for the plurality of attributes of the data. The multidimensional histogram may be converted to a one-dimensional histogram by assigning each bucket of the multidimensional histogram to corresponding buckets of the one-dimensional histogram and ordering the corresponding buckets according to a space-filling curve. One or more bucket ranges of the one-dimensional histogram may be determined by mapping the query conditions on the one-dimensional histogram. The selectivity of the query may be estimated by estimating how many data values in the one or more bucket ranges will meet the query conditions.

9 Claims, 8 Drawing Sheets

(56) References Cited

U.S. PATENT DOCUMENTS

| | | |
|---|---|---|
| 7,010,516 B2 | 3/2006 | Leslie |
| 7,725,425 B2 | 5/2010 | Smartt |
| 2011/0145244 A1 | 6/2011 | Kim et al. |
| 2012/0317092 A1* | 12/2012 | Roh .................. G06F 17/30469 707/713 |
| 2013/0318069 A1* | 11/2013 | Alu .................. G06F 17/30463 707/718 |
| 2014/0095475 A1 | 4/2014 | Su et al. |
| 2014/0114950 A1 | 4/2014 | Halverson et al. |

OTHER PUBLICATIONS

Roh et al., "Efficient construction of histograms for multidimensional data using quad-trees", ScienceDirect, Decision Support Systems, Dec. 2011, pp. 82-94, vol. 52, Issue 1, © 2014 Elsevier B.V.

Scholl, "Architecture and Implementation of Database Management Systems," Lecture Slides on Selectivity Estimation from the University of Konstanz, Department of Computer and Information Science, Nov. 2006, Chapter 9 http://www.inf.uni-konstanz.de/dbis/teaching/ws0607/arch-dbms/.

Anonymous, "Parallel multidimensional query's selectivity estimation using integrable function", IP.com Prior Art Database, IP.com No. IPCOM000236474D, IP.com Electronic Publication: Apr. 29, 2014 http://ip.com/IPCOM/000236474.

Gaza et al., "Selectivity Estimation for Query Execution Planning in a Database," U.S. Appl. No. 14/517,964, filed Oct. 20, 2014.

List of IBM Patents or Patent Applications Treated as Related.

* cited by examiner

SELECTIVITY ESTIMATION FOR QUERY EXECUTION PLANNING IN A DATABASE

BACKGROUND

This disclosure relates generally to query execution planning in a database, and more specifically, techniques for estimating selectivity.

Before query execution, most database management systems employ an optimizer engine to determine the most efficient method to access requested query data. The optimizer thus generates the best execution plan, which is the plan with the lowest cost among all other candidate plans in cost-based optimizers. The estimator is a component of the optimizer that estimates the overall cost of each candidate execution plan so as to allow the optimizer to choose the query execution plan with the lowest estimated cost. One measure of the estimator to help achieve the cost estimation objective is selectivity estimation, which internally calculates the percentage of rows that will be selected in a row set based on the query request.

Selectivity is particularly important when queries are multidimensional (have multiple attributes/data columns), as accurate estimates are increasingly more difficult to achieve when the query task becomes more complex. Inaccurate estimation may result in the selection of a plan that is very costly, leading to an inefficient database management system. Estimating selectivity based on multidimensional queries may still not be used in many products due to the calculation complexity and bad results.

SUMMARY

One or more embodiments are directed to a computer-implemented method of estimating selectivity of a query, the query having a plurality of query conditions with respect to two or more attributes. The method can include generating, for data stored in a database in a memory, a one-dimensional value distribution for each of a plurality of attributes of the data. The method can also include generating a multidimensional histogram, wherein the multidimensional histogram includes the one-dimensional value distributions for the plurality of attributes of the data. Further, the method can include converting the multidimensional histogram to a one-dimensional histogram by assigning each bucket of the multidimensional histogram to corresponding buckets of the one-dimensional histogram and ordering the corresponding buckets according to a space-filling curve. Moreover, the method can include determining one or more bucket ranges of the one-dimensional histogram by mapping the query conditions on the one-dimensional histogram. In addition, the method can include estimating the selectivity of the query by estimating how many data values in the one or more bucket ranges will meet the query conditions.

One or more embodiments are directed to a system for estimating selectivity for query execution planning. The system can include a computing device having a processor and a memory. The memory can store a database query optimizer engine and a query estimator. The optimizer engine and the query estimator, when executed by the processor, are operable to perform the following operations: An operation to generate, for data stored in a database in a memory, a one-dimensional value distribution for each of a plurality of attributes of the data. In addition, an operation to generate a multidimensional histogram, wherein the multidimensional histogram includes the one-dimensional value distributions for the plurality of attributes of the data. Further, an operation to convert the multidimensional histogram to a one-dimensional histogram by assigning each bucket of the multidimensional histogram to corresponding buckets of the one-dimensional histogram and ordering the corresponding buckets according to a space-filling curve. An operation to determine one or more bucket ranges of the one-dimensional histogram by mapping the query conditions on the one-dimensional histogram. Moreover, an operation to estimate the selectivity of the query by estimating how many data values in the one or more bucket ranges will meet the query conditions.

One or more embodiments are directed to a computer program product that estimates selectivity of a query within a database. The computer program product comprises a computer readable storage medium having program code embodied therewith. The program code comprises computer readable program code that may be configured for generating, for data stored in a database in a memory, a one-dimensional value distribution for each of a plurality of attributes of the data. Additionally, the computer readable program code may be configured for generating a multidimensional histogram, wherein the multidimensional histogram includes the one-dimensional value distributions for the plurality of attributes of the data. The computer readable program code may be configured for converting the multidimensional histogram to a one-dimensional histogram by assigning each bucket of the multidimensional histogram to corresponding buckets of the one-dimensional histogram and ordering the corresponding buckets according to a space-filling curve. Further, the computer readable program code may be configured for determining one or more bucket ranges of the one-dimensional histogram by mapping the query conditions on the one-dimensional histogram. Moreover, the computer readable program code may be configured for estimating the selectivity of the query by estimating how many data values in the one or more bucket ranges will meet the query conditions.

The above summary is not intended to describe each illustrated embodiment or every implementation of the present disclosure.

BRIEF DESCRIPTION OF THE DRAWINGS

In the Figures and the Detailed Description, like numbers refer to like elements.

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to query execution planning within a database, and more particular aspects relate to estimating selectivity based on converting a multidimensional histogram into a one-dimensional histogram, and mapping conditions accordingly. While the present disclosure is not necessarily limited to such applications, various aspects of the disclosure may be appreciated through a discussion of various examples using this context.

Figure 1:
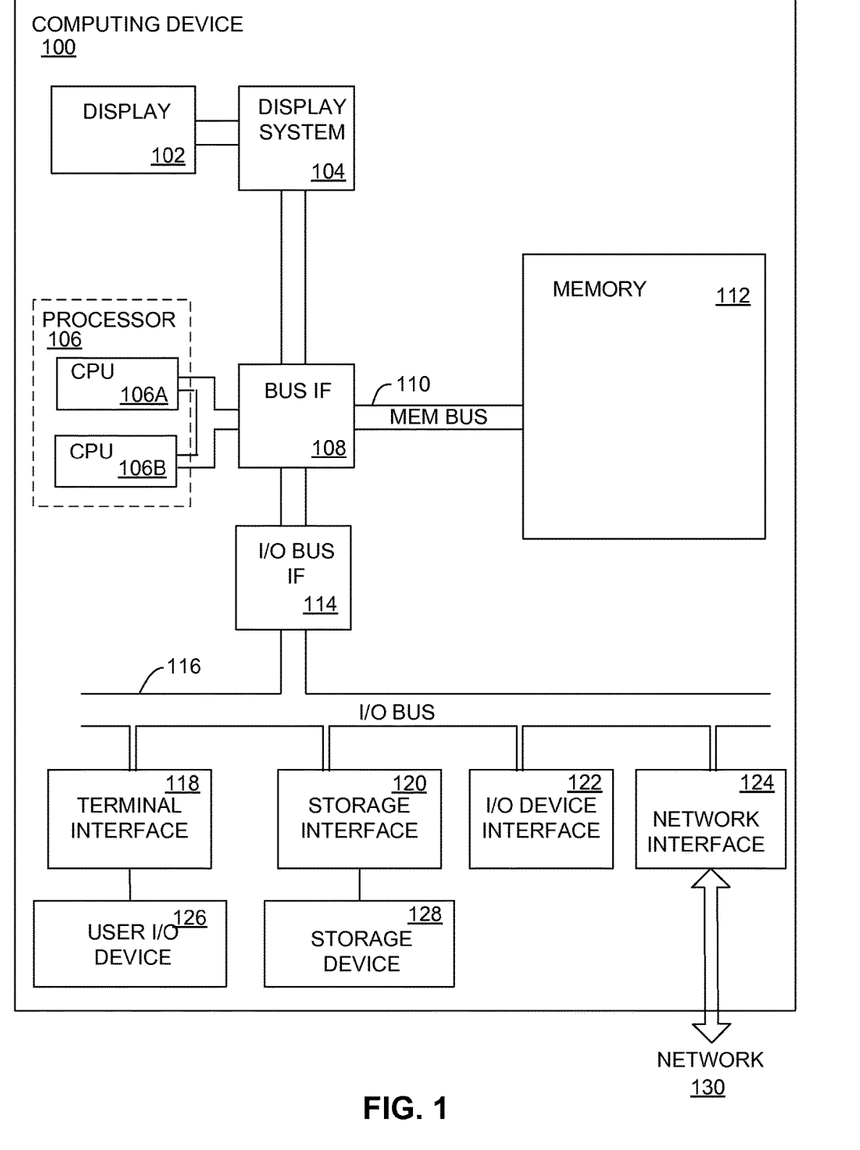
FIG. 1 is a block diagram illustrating an exemplary embodiment of a computing device that includes a memory.

FIG. 1 is a block diagram illustrating an exemplary embodiment of a computing device that includes a memory. The components of the computing device 100 can include one or more processors 106, a memory 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory 112.

The computing device 100 may include a bus interface unit 108 to handle communications among the processor 106, the memory 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or a storage device 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of the memory 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory 112, the bus interface unit 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the bus interface unit 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory 112 may include a random-access semiconductor memory, storage device, or storage medium (either volatile or non-volatile) for storing or encoding data and programs. In another embodiment, the memory 112 represents the entire virtual memory of the computing device 100, and may also include the virtual memory of other computer systems coupled to the computing device 100 or connected via a network 130. The memory 112 may be a single monolithic entity, but in other embodiments the memory 112 may include a hierarchy of caches and other memory devices. For example, memory may exist in multiple levels of caches, and these caches may be further divided by function, so that one cache holds instructions while another holds non-instruction data, which is used by the processor. Memory 112 may be further distributed and associated with different CPUs or sets of CPUs, as is known in any various so-called non-uniform memory access (NUMA) computer architectures.

Figure 2:
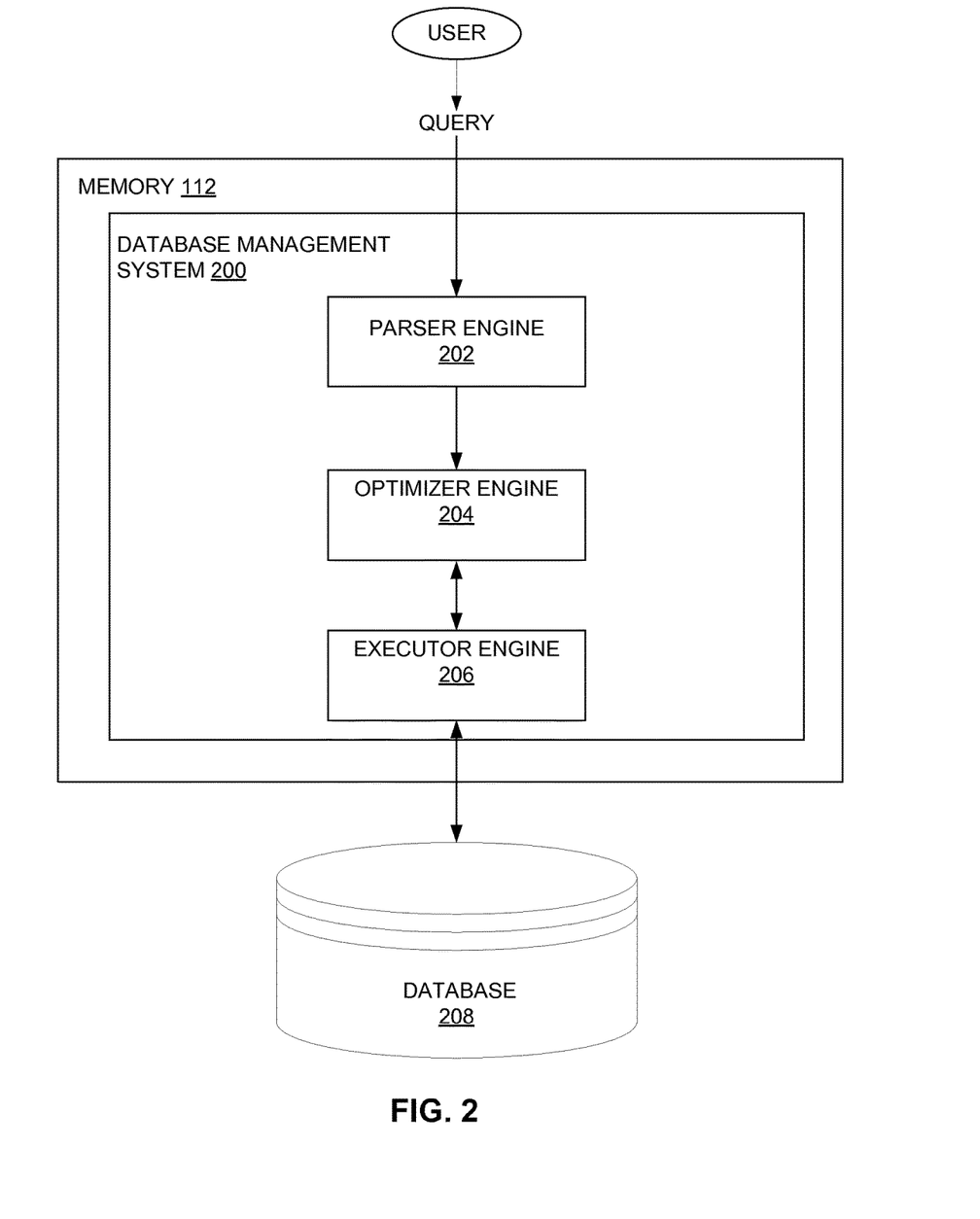
FIG. 2 is a block diagram illustrating an exemplary embodiment of components and data that can reside in the memory of FIG. 1, including an optimizer engine.

The memory 112 may store all or a portion of the components and data shown in FIG. 2. These programs and data structures are illustrated in FIG. 2 as being included within the memory 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 112, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 106 or instructions or statements that are interpreted by instructions or statements that execute the processor 106 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different ways, including using various computer applications, routines, components, programs, objects, modules, data structures etc., which may be referred to herein as "software," "computer programs," or simply "programs."

FIG. 2 is a block diagram illustrating an exemplary embodiment of components and data that can reside in the memory of FIG. 1, including an optimizer engine. In an embodiment, the database management system 200 may include a parser engine 202, an optimizer engine 204, and an executor engine 206 that are operable to execute a relatively efficient query execution plan. In one embodiment, the parser engine 202 may receive a multidimensional query request and check that the query is correctly specified, resolve names and references, and convert the multidimensional query request into a format utilized by the optimizer engine 204. The multidimensional query request may be expressed in any suitable language, such as MDX, SQL, DML or any other language. The parser engine 202 may separate the multidimensional query request into a data structure, which gives a structural representation of the multidimensional query request. For example, the data structure may be an abstract syntax tree, parse tree or other data structure. In an embodiment, the parser engine 202 may make a plurality of checks, including a syntax check, a check determining whether the multidimensional query request is meaningful, and a shared pool check.

In an embodiment, the optimizer engine 204 may receive a parsed query from the parser engine 202 and determine an efficient method to access the data from the multidimensional query request. Embodiments of the optimizer engine 204 are further described below.

In an embodiment, the executor engine 206 receives a query execution plan according to the optimizer engine 204, and executes a query plan against the database 208. The executor engine 206 may order rows or tables in any particular manner according to any join method. For example, the executor engine may choose a nested loop, sort merge, or hash method as its chosen join method.

Figure 3:
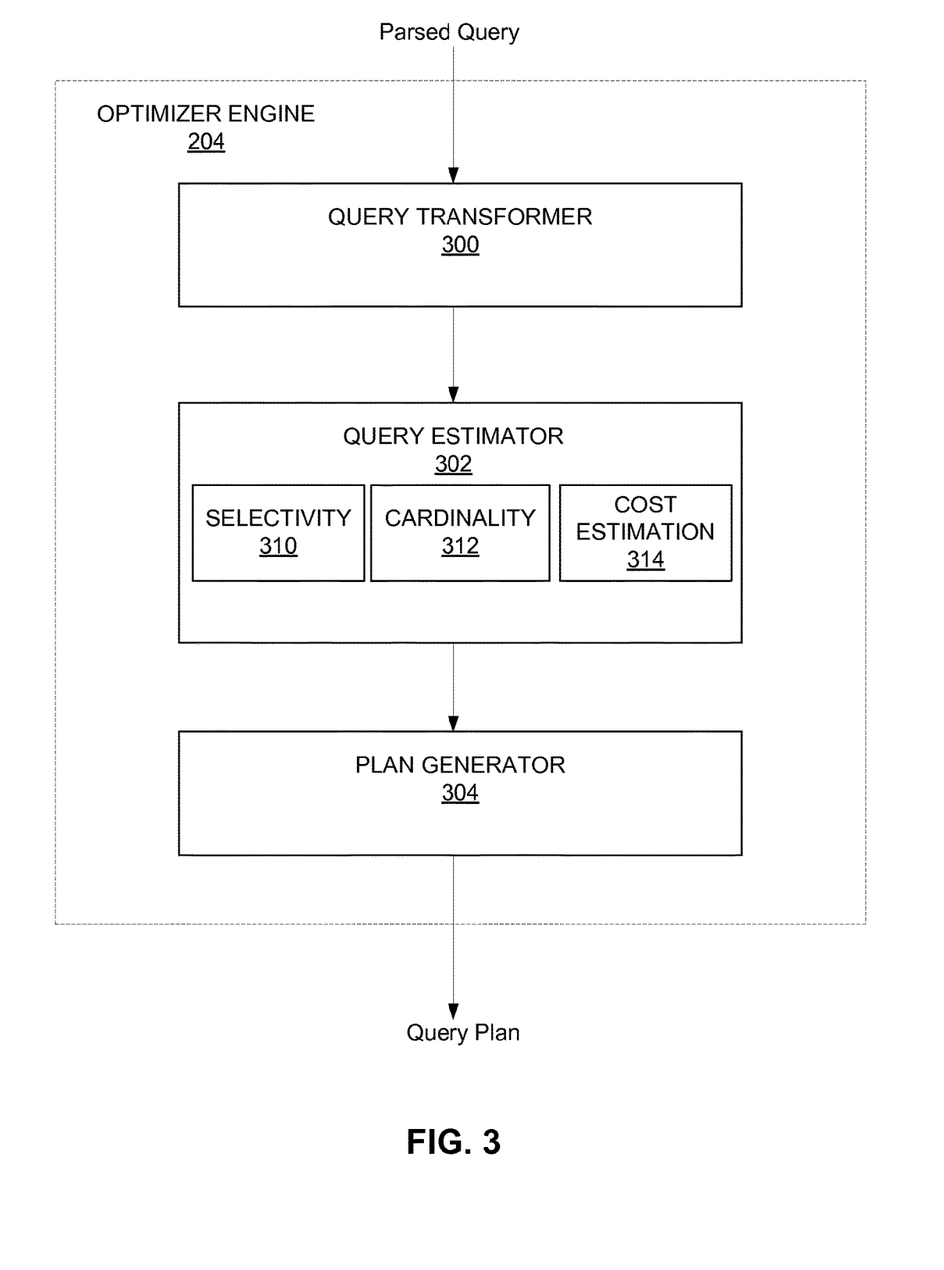
FIG. 3 is a block diagram illustrating an exemplary embodiment of the optimizer engine of FIG. 2, which includes a query estimator.

FIG. 3 is a block diagram illustrating an exemplary embodiment of the optimizer engine of FIG. 2, which includes a query estimator. In one embodiment, the optimizer engine 204 may include a query transformer 300, a query estimator 302, and a plan generator 304. In an embodiment, the query transformer 300 receives a parsed query from the parser engine 202, and determines whether the form of the query should be changed to enhance an execution plan. For example, a search engine may return too many irrelevant references given a particular query request, and the transformer may rewrite such query request that originally included an "OR" connector into an output query that includes an "ALL" connector.

In an embodiment, such as in a cost-based optimizer, the query estimator 302 receives the transformed query from the query transformer 300, and determines the overall cost of an execution plan. The query estimator 302 may utilize a plurality of measures to determine the overall cost of an execution plan. In an embodiment, the query estimator 302 uses at least three measures: selectivity 310, cardinality 312, and cost estimation 314. Selectivity 310 will be discussed further below. Cardinality 312 may be estimated in a plurality of different ways using a plurality of different mechanisms. In one embodiment, cardinality 312 may be achieved by multiplying the selectivity 310 by the row count of an operator's child. For example, if an operator has a selectivity 310 of 0.3 (30%), and receives 200 rows from a lower level operator, it has a cardinality of 60 rows (200*0.3). In an embodiment, the resulting cost estimation 314 function displays the cost according to selectivity 310 and cardinality 312.

In an embodiment, the plan generator 304 receives the cost estimation 314 of each query execution plan from the query estimator 302, and the plan generator 304 compares each query execution plan and accordingly chooses a query execution plan with a low cost relative to other query execution plans. For example, the plan generator 304 may actually compare the cost estimation 314 of different access paths, join methods, or join orders of different plans. In an example, the plan generator may compare query execution plans by comparing join methods of hashing and nested loop, and may compare different access paths of indexing. In an embodiment, the result of the plan generator 304 is a chosen query plan with a low cost that may be implemented by the executor engine 206.

Figure 4:
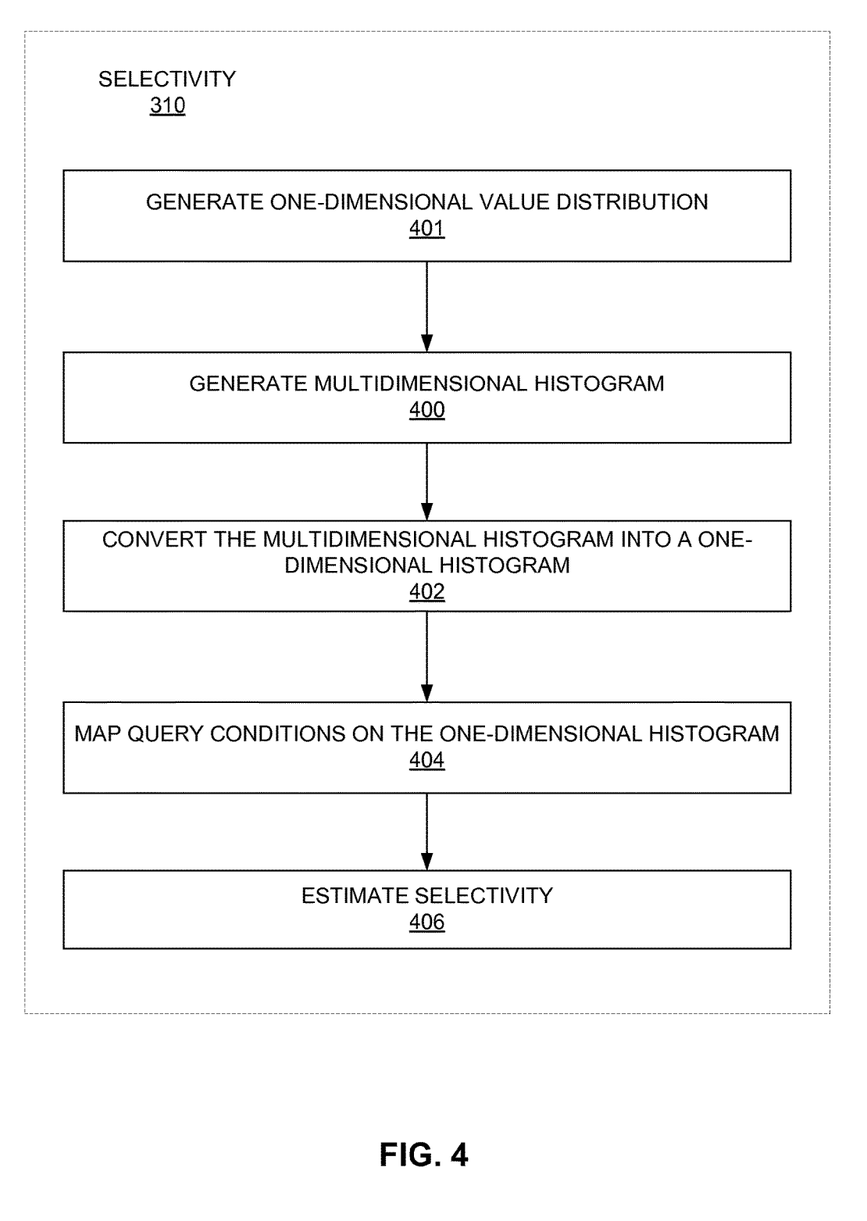
FIG. 4 is a flow diagram illustrating an exemplary process for estimating selectivity of a query within the query estimator of FIG. 3, according to one or more embodiments.

FIG. 4 is a flow diagram illustrating an exemplary process for estimating selectivity of a query within the query estimator of FIG. 3, according to one or more embodiments. FIG. 4 is in no way limited to the configuration or order as shown, as one or more operations may occur simultaneously, in different orders, or within different database management system ("DMS") engines. In various embodiments, selectivity 310 may represent an estimated fraction of rows or values from a row-set of a base table, a view, the result of a join, or any other row set objects.

In operation 401, the query estimator 302 or other DMS engine generates, for data stored in a database in a memory, a one-dimensional value distribution for each of a plurality of attributes of the data. In various embodiments, the query estimator 302 or other DMS engine may generate a one-dimensional value distribution in a variety of different manners using a variety of different system statistics. In an embodiment, the query estimator 302 or other DMS engine may receive the query at a first time, wherein the generating the one-dimensional value distributions and the generating the multidimensional histogram are performed at a second time prior to the first time. For example, the query estimator 302 or other DMS engine may generate the one-dimensional value distributions before the query request is received. Thus, before the query request, the query estimator 302 or other DMS engine can utilize sampling for a most commonly queried set of attributes to generate the one-dimensional value distributions. Alternatively, the query estimator 302 or other DMS engine may create the one-dimensional value distributions in response to a query request. In an embodiment, the one-dimensional value distributions may be configured by creating a simple histogram or utilizing density functions. For example, a simple histogram for each attribute (column) of the data may be built using DBMS_STATS. In another example, a simple histogram may also be built by creating them as needed ("salt and pepper" approach). In yet another example, a simple histogram may be built for all columns ("over kill hammer" approach). In various embodiments, the simple histogram type may be frequency, top frequency, height based, hybrid, or other simple histogram configurations. In various embodiments, the query estimator 302 or other DMS engine utilizes several different mechanisms to gather data for simple histogram preparation such as data sampling, direct queries that verify the number of rows for a given bucket range of values (also referred to as intervals or periods), modification of insertion, deletion operations to update the simple histogram matrix, or any other data gathering mechanism. In an embodiment, one or more attributes of the simple histogram is divided into equal bucket ranges such that each bucket includes substantially the same number of rows. For example, the query estimator 302 or other DMS engine may organize a plurality of simple histogram bucket ranges where the number of rows for each bucket range (labeled i) is the same for all bucket ranges within the attribute K, as represented below:

$$\forall i,j \in \{1 \ldots L\} \#[x_K^i, x_K^{i+1}] \approx \#[x_K^j, x_K^{j+1}]$$

$$[x_1^{k_1}, x_1^{k_1+1}]x \ldots x[x_k^{k_k}, x_k^{k_k+1}].$$

In another embodiment, the step of one or more attributes of the simple histogram being divided into equal bucket ranges such that each bucket includes substantially the same number of rows may also be based on column statistics, such as data spread interpolation. For example, assuming that every data spread representation can be translated to a density function, this step may be done by solving a linear set of equations, as represented below:

$$\int_{x_1}^{x_2} f(x)dx = K$$

$$\int_{x_2}^{x_3} f(x)dx = K$$

$$\ldots$$

$$\int_{x_n}^{x_{n+1}} f(x)dx = K.$$

In operation 400, the query estimator 302 or other DMS engine may generate a multidimensional histogram, wherein the multidimensional histogram includes the one-dimensional value distributions for the plurality of attributes of the data and each dimension of the multidimensional histogram corresponds to one attribute of the data and reflects the respective one-dimensional value distribution of the corresponding one attribute. For example, as a result of one or more attributes of the simple histogram being divided into equal bucket ranges such that each bucket includes substantially the same number of rows, the query estimator 302 or other DMS engine may build a multidimensional discrete matrix in which (k_1, . . . , k_K) element represented below:

$$[x_1^{k_1}, x_1^{k_1+1}]x \ldots x[x_K^{k_K}, x_K^{k_K+1}]$$

will contain the number of rows/tuples that fulfill a set of query conditions: C1, . . . , Cn where $$C_1\{x_1^{k_1} < col_1 < x1k_1 + 1\}$$

$$\ldots$$

$$C_K\{x_K^{k_k} < col_1 < x_K^{k_k+1}\}.$$

In an embodiment, the output of building the multidimensional discrete matrix as specified above, is a multidimensional histogram. In an embodiment, as a part of the generating a multidimensional histogram, the query estimator 302 or other DMS engine may generate buckets having substantially equal numbers of rows. For example, each multidimensional histogram bucket may include a particular number of rows that are within five percent of an average number of rows per bucket. In yet another embodiment, the query estimator 302 or other DMS engine divides each multidimensional histogram bucket into asymmetric bucket ranges such that the multidimensional bucket includes a skewed number of rows.

Figure 5:
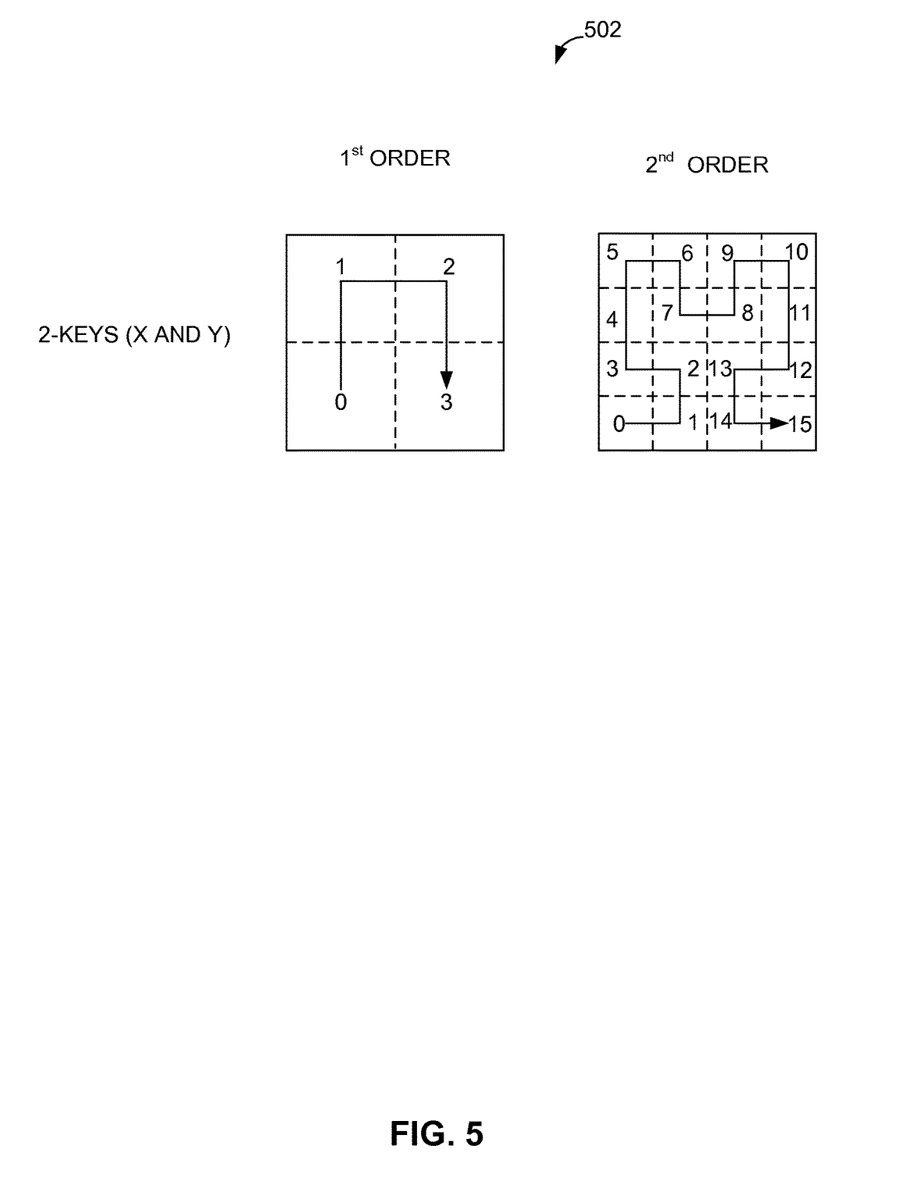
FIG. 5 is a diagram illustrating an exemplary embodiment of a Hilbert Filling curve, and the order in which the corresponding buckets of the one-dimensional histogram may be as signed.

Operation 402 may occur when the query estimator 302 or other DMS engine converts the multidimensional histogram to a one-dimensional histogram by assigning each bucket of the multidimensional histogram to corresponding buckets of the one-dimensional histogram and ordering the corresponding buckets according to a space-filling curve. In the present disclosure, the space-filling curve may be utilized to define an order for the histogram buckets by assigning multiple vectors of indexes along a given order to a single index. This process is in stark contrast to defining an order for the actual values of multidimensional space, which may cause cost or accuracy problems. In an embodiment, the space-filling curve is a Hilbert filling curve. FIG. 5 is a diagram illustrating an exemplary embodiment of a Hilbert filling curve, and the order in which the corresponding buckets of the one-dimensional histogram may be assigned. According to FIG. 5, in the $1^{st}$ order, 2 keys example, a vector of indexes (0,0), which corresponds to the multidimensional histogram bucket, may be assigned to a single index 0, which corresponds to a respective bucket of the one-dimensional histogram. A vector of indexes (0,1) may be assigned to single index 1. A vector of indexes (0,2) may be assigned to a single index 2. A vector of indexes (0,3) may be assigned to single index 3 and so forth. Each resulting single index may be assigned in a particular Hilbert curve order, as indicated by the arrow in FIG. 5. The output of operation 402 may be a table that displays a set of single indexes and the corresponding number of rows in each bucket of the one-dimensional histogram. In other embodiments, the space-filling curve may be a Z-curve, a Moore curve, a Sierpinski curve, or any other space-filling curve.

Figure 6:
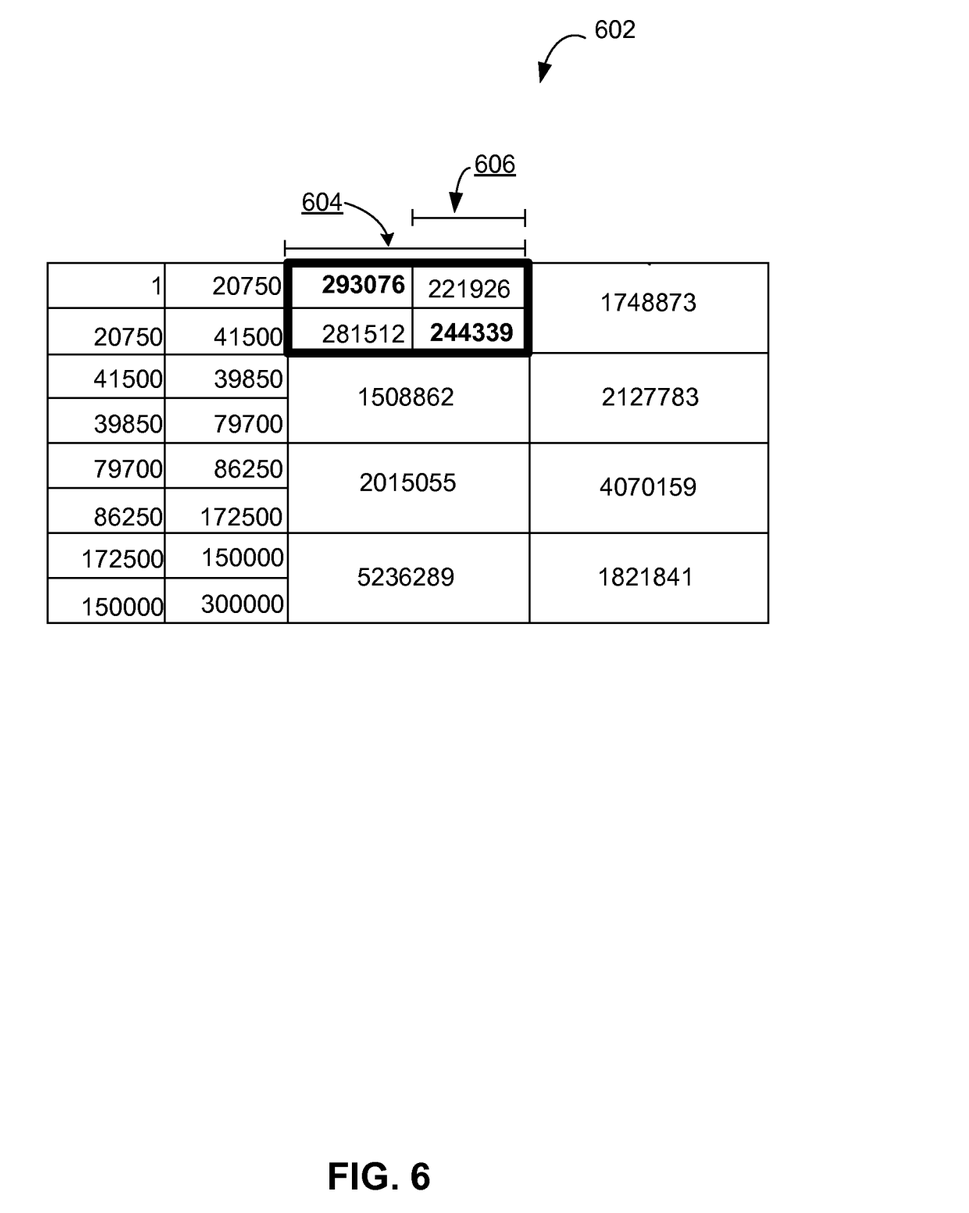
FIG. 6 is a table illustrating an exemplary embodiment of a one-dimensional histogram bucket for which query conditions have been mapped and which are divided into four sub-buckets.

Operation 404 may occur when the query estimator 302 or other DMS engine receives the one-dimensional histogram from operation 402, and determines one or more bucket ranges of the one-dimensional histogram by mapping the query conditions on the one-dimensional histogram. In an embodiment, the mapping the query conditions on the one-dimensional histogram includes determining first bucket ranges of the one-dimensional histogram, wherein the query conditions partially overlap the first bucket ranges, and dividing the first bucket ranges into two or more sub-buckets having substantially equal sub-bucket ranges. For example, FIG. 6 is a table illustrating an exemplary embodiment of a one-dimensional histogram bucket for which query conditions have been mapped and which are divided into four sub-buckets. As shown in the table 602, the one-dimensional histogram bucket 604 is split into four sub-buckets 606 (sub-buckets 293076, 221926, 281512, and 244339) in order to determine one or more bucket ranges within each one-dimensional histogram bucket 604. In various embodiments, the mechanism that divides each one-dimensional histogram bucket into sub-buckets may be any data gathering mechanism such as sampling, direct queries, modification of insertion and deletion operations, and other system statistics. In an embodiment, the query estimator 302 or other DMS engine may select two opposite sub-buckets (also known as "corners") of the one-dimensional histogram bucket for which the difference between sub-buckets is greater ("one-dimensional histogram bucket diagonal"). For example, in the one-dimensional histogram bucket 604, the difference between sub-buckets 293076 and 244339 is greater than the difference between sub-buckets 281512 and 221926. Accordingly, the query estimator 302 or other DMS engine may select the upper left sub-bucket and lower right sub-bucket within the one-dimensional histogram bucket 604 as the chosen one-dimensional histogram bucket diagonal to help estimate the number of rows or values in the one-dimensional histogram bucket 604. In an embodiment, the query estimator 302 or other DMS engine may then fine-tune the mapping of the query conditions by determining portions of the first bucket ranges for which the query conditions overlap and modeling distributions of data values within the portions. For example, a query estimator 302 or other DMS engine may utilize an integral function along each one-dimensional histogram bucket diagonal as the determined portions, such as in the below demonstration: the query estimator 302 or other DMS engine may make a one-dimensional representation of the one-dimensional histogram bucket (bucket i) as a linear function above [i, i+1] bucket range, which defines the number of rows for the one-dimensional bucket i and reflects the data spread along the chosen one-dimensional histogram bucket diagonal:

$\int_i^{i+1} f$ (defines the number of rows for the one-dimensional bucket i)

f' (i+0,5) (reflects the data spread along the chosen one-dimensional histogram bucket diagonal).

In an embodiment, the above two properties are two query conditions that may be written as linear equations and provide the query estimator 302 or other DMS engine the appropriate integral function to utilize on the one-dimensional histogram bucket diagonals for those buckets on which the query conditions are mapped. The output of operation 404 may be a one-dimensional representation of data spread for which bucket ranges have been determined.

Figure 7:
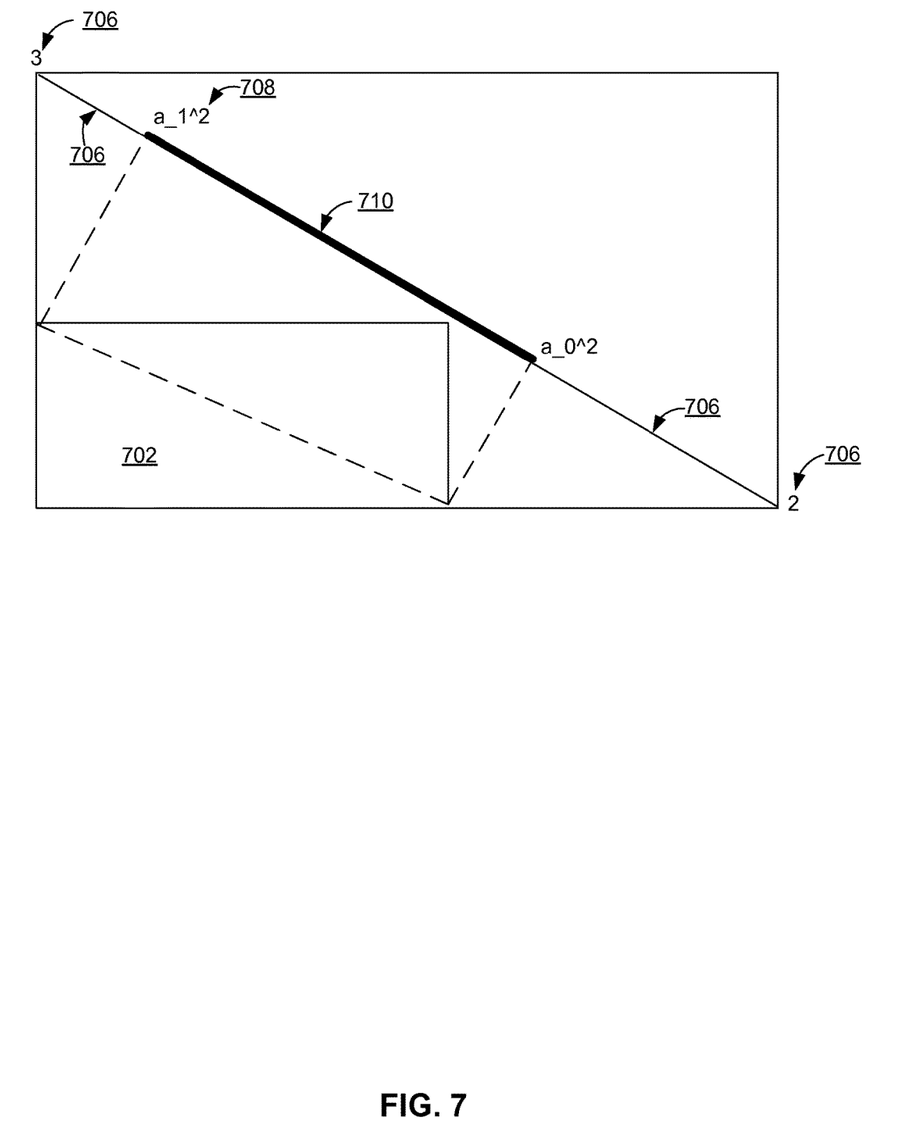
FIG. 7 is a diagram illustrating an exemplary embodiment of a chosen bucket range of values that is estimated to reflect a query conditional cube.

In operation 406, the query estimator 302 or other DMS engine may estimate the selectivity of the query by estimating how many data values in the one or more bucket ranges will meet the query conditions. In an embodiment, the query conditions are represented as a conditional cube placed somewhere in the space of possible values. In an embodiment, the query estimator 302 or other DMS engine may estimate how many data values in the one or more bucket ranges will meet the query conditions by projecting a respective corner of the query conditional cube to a one-dimensional histogram bucket diagonal and calculating a ratio of a one-dimensional bucket field to a query conditional cube field to be the same as a ratio of a chosen bucket range of values to the one-dimensional histogram bucket diagonal. This projection may reflect the size of the query conditional cube and reflect how far the query conditional cube is from the one-dimensional histogram bucket diagonal, which would give a final selectivity estimation for a particular one-dimensional histogram bucket. For example, FIG. 7 is a diagram illustrating an exemplary embodiment of a chosen bucket range of values that is estimated to reflect a query conditional cube. According to FIG. 7, the query estimator 302 or other DMS engine may perform a projection of the query conditional cube 702 to a corresponding one-dimensional histogram bucket range 706, which is [2,3]. In order to reflect how far the query conditional cube 702 is from the one-dimensional histogram bucket diagonal 708, a respective corner of the query conditional cube 702 may be projected to the one-dimensional histogram bucket diagonal 708. As shown in FIG. 7, the corner of the query conditional cube 702 is projected to the one-dimensional histogram bucket diagonal 708 to a_1/√2. To reflect the size of the conditional cube, the query estimator or other DMS engine may calculate a ratio of a one-dimensional bucket field to a query conditional cube field to be the same as a ratio of a chosen bucket range of values 710 to the length of the one-dimensional histogram bucket diagonal 708. As a result, there is a chosen bucket range of values 710 (indicated by dark black line) that reflects the query conditional cube 702 in one-dimensional space. In an embodiment, the query estimator 302 or DMS engine may take the sum of integrals of a function above a set of ranges (as specified in operation 404) obtained from each one-dimensional histogram bucket, for which the query conditions were mapped, to complete a final estimation of the number of rows in a particular query conditional cube.

Figure 8:
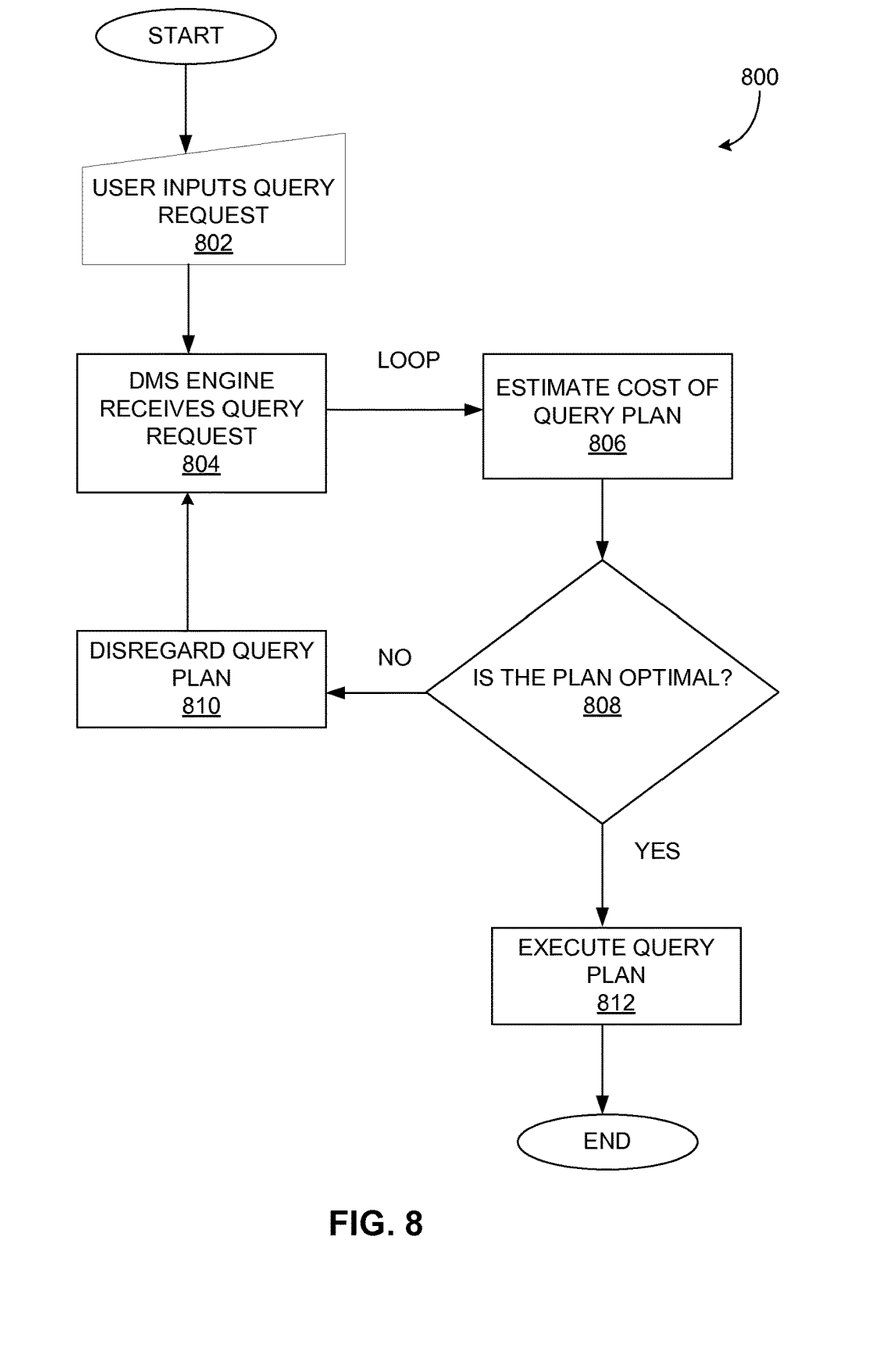
FIG. 8 is a flow diagram illustrating an example of a process for choosing a relatively efficient query execution plan in preparation for query execution, according to one or more embodiments.

FIG. 8 is a flow diagram illustrating an example of a process for choosing a relatively efficient query execution plan in preparation for query execution, according to one or more embodiments. The process 800 may start with input operation 802, wherein a user inputs a particular multidimensional query request. A user need not be a person, but input operation 802 may result from a computing device that communicates with another computing device, or any other process or mechanism that may input a multidimensional query request. In operation 804, the database management system 200 may receive the multidimensional query request as articulated by the user in input operation 802. In an embodiment, the database management system 200 may include an optimizer engine 204 and a query estimator 302. The optimizer engine 204 and the query estimator 302 are operable to perform operation 806 to estimate the cost of a query execution plan. The query estimator 302 may estimate the selectivity 310 of a query execution plan as part of operation 806. In an embodiment, the query execution plan more optimal relative to other query execution plans, according to operation 808, is the plan with the lowest total cost. In various embodiments, the operation 808 may be performed by the plan generator 304 or any other aspect of the database management system 200. In an embodiment, if the query execution plan is more optimal relative to other query execution plans, according to operation 808, then the query execution plan is executed as shown in operation 812. In an embodiment, the executor engine 206 executes the query execution plan. In another embodiment, if the query execution plan is not more optimal than other query execution plans, then the plan is disregarded as shown in operation 810.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of estimating selectivity of a query, the query having a plurality of query conditions with respect to two or more attributes, the method comprising:
   generating, for data stored in a database in a memory, a one-dimensional value distribution for each of a plurality of attributes of the data, the one-dimensional value distribution includes a simple histogram;
   generating a multidimensional histogram, wherein the multidimensional histogram includes the one-dimensional value distributions for the plurality of attributes of the data, the generating of the multidimensional histogram includes dividing one or more attributes of the simple histogram into particular bucket ranges and responsively generating a multidimensional discrete matrix of the bucket ranges;
   converting the multidimensional histogram to a one-dimensional histogram by assigning each bucket of the multidimensional histogram to corresponding buckets of the one-dimensional histogram and ordering the corresponding buckets according to a space-filling curve;
   determining one or more bucket ranges of the one-dimensional histogram by mapping the query conditions on the one-dimensional histogram; and
   estimating the selectivity of the query by estimating how many data values in the one or more bucket ranges will meet the query conditions.

2. The method of claim 1, wherein the space-filling curve is one of a Z-curve, a Moore curve, or a Sierpinski curve.

3. The method of claim 1, wherein the generating a multidimensional histogram includes generating buckets having equal numbers of rows.

4. The method of claim 1, wherein the mapping the query conditions on the one-dimensional histogram includes determining first bucket ranges of the one-dimensional histogram, wherein the query conditions partially overlap the first bucket ranges, and dividing the first bucket ranges into two or more sub-buckets having substantially equal sub-bucket ranges.

5. The method of claim 4, wherein the mapping the query conditions on the one-dimensional histogram includes determining portions of the first bucket ranges for which the query conditions overlap and modeling distributions of data values within the portions.

6. The method of claim 1, wherein the estimating the selectivity of the query includes:
   projecting a respective corner of a query conditional cube to a one-dimensional histogram bucket diagonal and calculating a ratio of a one-dimensional bucket field to a query conditional cube field to be the same as a ratio of a chosen bucket range of values to the one-dimensional histogram bucket diagonal.

7. The method of claim 1, further comprising receiving the query at a first time, wherein the generating the one-dimensional value distributions and the generating the multidimensional histogram are performed at a second time prior to the first time.

8. A computer-implemented method of estimating selectivity of a query, the method comprising:
   generating a multidimensional histogram, wherein the multidimensional histogram includes a one-dimensional value distributions for a plurality of attributes of data;
   converting the multidimensional histogram to a one-dimensional histogram, wherein the converting includes assigning each bucket of the multidimensional histogram to corresponding buckets of the one-dimensional histogram and ordering the corresponding buckets along a space-filling curve, wherein the converting further includes assigning multiple vectors of indexes along a given order to a single index;
   determining one or more bucket ranges of the one-dimensional histogram by mapping the query conditions on the one-dimensional histogram; and
   estimating the selectivity of the query based on the converting of the multidimensional histogram to a one-dimensional histogram and projecting a respective corner of a query conditional cube to a one-dimensional histogram bucket diagonal and calculating a ratio of a one-dimensional bucket field to a query conditional cube field to be a same ratio of a chosen bucket range of values to the one-dimensional histogram bucket diagonal, wherein the projection reflects a size of the query conditional cube and how far the query conditional cube is from the one-dimensional histogram bucket diagonal.

9. A computer-implemented method of estimating selectivity of a query, the query having a plurality of query conditions with respect to two or more attributes, the method comprising:
   generating, for data stored in a database in a memory, a one-dimensional value distribution for each of a plurality of attributes of the data;
   generating a multidimensional histogram, wherein the multidimensional histogram includes the one-dimensional value distributions for the plurality of attributes of the data, wherein the multidimensional histogram includes a representation of values that are parsed into a plurality of buckets, each of the buckets corresponding to a grouping of column values;

converting the multidimensional histogram to a one-dimensional histogram, wherein the converting includes assigning each bucket of the plurality of buckets to corresponding buckets of the one-dimensional histogram and ordering the corresponding buckets according to a space-filling curve;

determining one or more bucket ranges of the one-dimensional histogram by mapping the query conditions on the one-dimensional histogram, wherein the determining includes determining first bucket ranges of the one-dimensional histogram and dividing the first bucket ranges into two or more sub-buckets having substantially equal sub-bucket ranges; and estimating the selectivity of the query by estimating how many data values in the one or more bucket ranges will meet the query conditions and projecting a respective corner of a query conditional cube to a one-dimensional histogram bucket diagonal and calculating a ratio of a one-dimensional bucket field to a query conditional cube field to be a same ratio of a chosen bucket range of values to the one-dimensional histogram bucket diagonal, wherein the projection reflects a size of the query conditional cube and how far the query conditional cube is from the one-dimensional histogram bucket diagonal.

* * * * *